United States Patent
Zhang et al.

(10) Patent No.: US 11,019,666 B2
(45) Date of Patent: May 25, 2021

(54) METHOD FOR RANDOM ACCESS, USER EQUIPMENT AND BASE STATION

(71) Applicant: Samsung Electronics Co., Ltd., Suwon-si (KR)

(72) Inventors: Yingjie Zhang, Beijing (CN); Bin Yu, Beijing (CN); Chen Qian, Beijing (CN); Di Su, Beijing (CN); Qi Xiong, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/474,355

(22) PCT Filed: Dec. 7, 2017

(86) PCT No.: PCT/KR2017/014310
§ 371 (c)(1),
(2) Date: Jun. 27, 2019

(87) PCT Pub. No.: WO2018/128284
PCT Pub. Date: Jul. 12, 2018

(65) Prior Publication Data
US 2019/0342925 A1 Nov. 7, 2019

(30) Foreign Application Priority Data

Jan. 6, 2017 (CN) .......................... 201710010607.1
Jan. 16, 2017 (CN) .......................... 201710029432.9

(51) Int. Cl.
*H04W 16/28* (2009.01)
*H04W 74/08* (2009.01)
(Continued)

(52) U.S. Cl.
CPC ....... *H04W 74/0841* (2013.01); *H04W 52/36* (2013.01); *H04W 52/42* (2013.01);
(Continued)

(58) Field of Classification Search
None
See application file for complete search history.

(56) References Cited

U.S. PATENT DOCUMENTS

| 5,673,259 | A | 9/1997 | Quick, Jr. | |
|---|---|---|---|---|
| 2004/0014452 | A1* | 1/2004 | Lim | H04B 7/18558 455/403 |

(Continued)

OTHER PUBLICATIONS

Samsung, "NR 4-step random access procedure", 3GPP TSG RAN WG1 NR Ad Hoc, Jan. 16-20, 2017, 14 pages, R1-1700891.
(Continued)

*Primary Examiner* — Sithu Ko

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Embodiments of the present invention provide a method for RACH re-attempt, a user equipment and a base station. The method comprises the steps of: by a base station, determining system configuration information and transmitting the system configuration information to a user equipment; and then, by the user equipment, transmitting a preamble sequence to perform random access, and if the random access is failed, performing RACH attempt according to the
(Continued)

received RACH re-attempt configuration information to perform random access until a preset decision condition is satisfied. The embodiment of the present invention is used for RACH re-attempt when random access fails.

12 Claims, 10 Drawing Sheets

(51) Int. Cl.
*H04W 52/36* (2009.01)
*H04W 52/42* (2009.01)
*H04W 52/48* (2009.01)
*H04W 52/50* (2009.01)
*H04W 74/00* (2009.01)

(52) U.S. Cl.
CPC ........... *H04W 52/48* (2013.01); *H04W 52/50* (2013.01); *H04W 74/006* (2013.01)

(56) References Cited

U.S. PATENT DOCUMENTS

| | | | |
|---|---|---|---|
| 2005/0053029 A1 | 3/2005 | Lee et al. | |
| 2010/0142470 A1* | 6/2010 | Park | H04L 1/1854 370/329 |
| 2010/0172299 A1* | 7/2010 | Fischer | H04W 74/002 370/328 |
| 2010/0232318 A1* | 9/2010 | Sarkar | H04W 24/02 370/254 |
| 2011/0170503 A1 | 7/2011 | Chun et al. | |
| 2011/0199905 A1 | 8/2011 | Pinheiro et al. | |
| 2014/0016573 A1 | 1/2014 | Nuggehalli et al. | |
| 2014/0254515 A1* | 9/2014 | Kim | H04W 74/0833 370/329 |
| 2014/0349712 A1* | 11/2014 | Shukla | H04W 52/50 455/561 |
| 2014/0376466 A1 | 12/2014 | Jeong et al. | |
| 2015/0036617 A1 | 2/2015 | Guo et al. | |
| 2015/0104549 A1* | 4/2015 | Castro Genera | A23L 5/13 426/231 |
| 2016/0100434 A1* | 4/2016 | Chen | H04W 52/50 370/329 |
| 2016/0113038 A1* | 4/2016 | Otani | H04W 4/90 370/329 |
| 2016/0262109 A1 | 9/2016 | Chen et al. | |
| 2017/0006599 A1* | 1/2017 | Dinan | H04L 27/26 |
| 2017/0332406 A1* | 11/2017 | Islam | H04W 52/242 |
| 2018/0176948 A1* | 6/2018 | Islam | H04W 52/242 |

OTHER PUBLICATIONS

Samsung et al., "WF on NR RACH Msg. 1 Re-transmission", 3GPP TSG RAN WG1 NR Ad Hoc, Jan. 16-20, 2017, 3 pages, R1-1701365.
Samsung, "4-step RACH procedure", 3GPP TSG RAN WG1 Meeting #89, May 15-19, 2017, 12 pages, R1-1707933.
Samsung et al., "WF on power ramping for UE changes Tx beam", 3GPP TSG RAN WG1 Meeting #NR 89, May 15-19, 2017, 3 pages, R1-1709493.
Samsung, "Power ramping and power control during RA procedure", 3GPP TSG RAN WG1 Meeting #Adhoc 2, Jun. 27-30, 2017, 4 pages, R1-1710635.
Samsung, "Remaining details on power ramping and power control during RA procedure", 3GPP TSG RAN WG1 Meeting #90, 6 pages, R1-1713561.
"3rd Generation Partnership Project; Technical Specification Group Radio Access Network; NR; Medium Access Control (MAC) protocol specification (Release 15)", 3GPP TS 38.321 V15.1.0 (Mar. 2018), 67 pages.
"3rd Generation Partnership Project; Technical Specification Group Radio Access Network; NR; Medium Access Control (MAC) protocol specification (Release 15)", 3GPP TS 38.321 V15.3.0 (Sep. 2018), 76 pages.
"3rd Generation Partnership Project; Technical Specification Group Radio Access Network; NR; Physical layer procedures for control (Release 15)", 3GPP TS 38.213 V15.1.0 (Mar. 2018), 77 pages.
"3rd Generation Partnership Project; Technical Specification Group Radio Access Network; NR; Physical layer procedures for control (Release 15)", 3GPP TS 38.213 V15.3.0 (Sep. 2018), 101 pages.
International Search Report dated Mar. 22, 2018 in connection with International Patent Application No. PCT/KR2017/014310, 14 pages.
Written Opinion of the International Searching Authority dated Mar. 22, 2018 in connection with International Patent Application No. PCT/KR2017/014310, 6 pages.
European Patent Office, "Supplementary European Search Report," Application No. EP17889596.7, dated Nov. 15, 2019, 5 pages.

* cited by examiner

[Fig. 1]
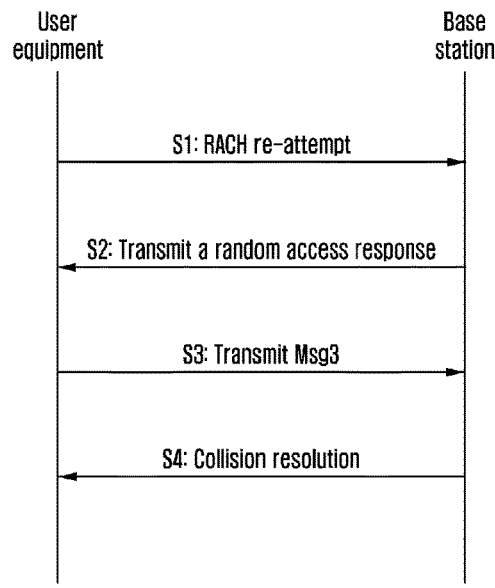
[Fig. 2]
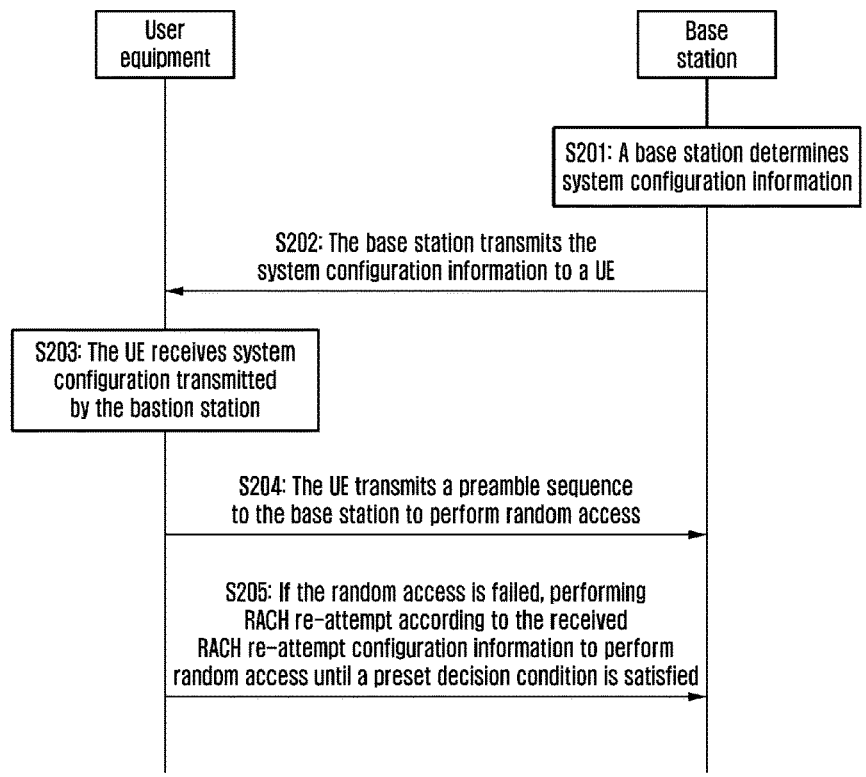
[Fig. 3]
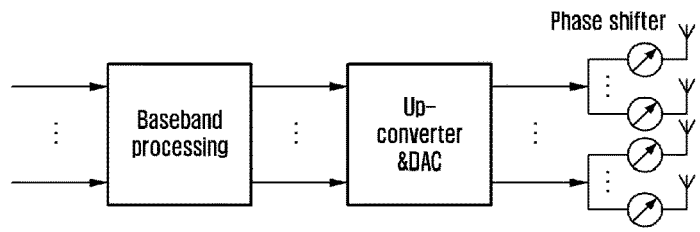

[Fig. 4]
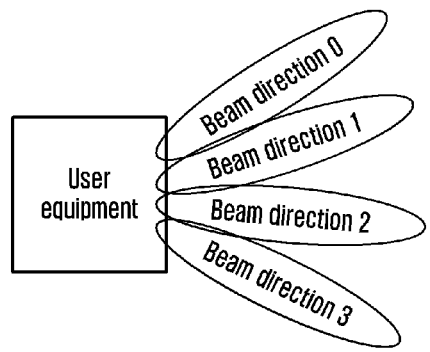
[Fig. 5]
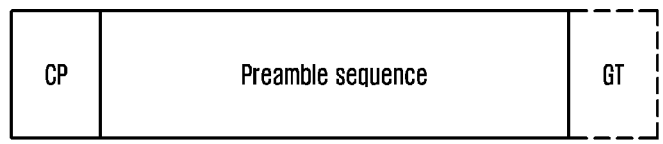
[Fig. 6]
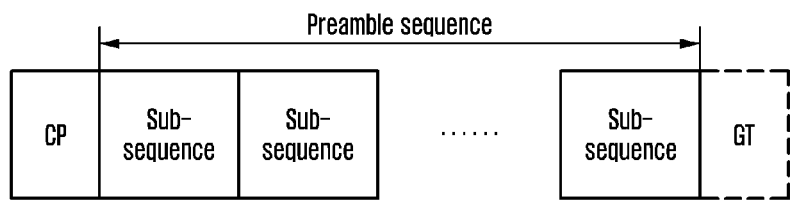
[Fig. 7]
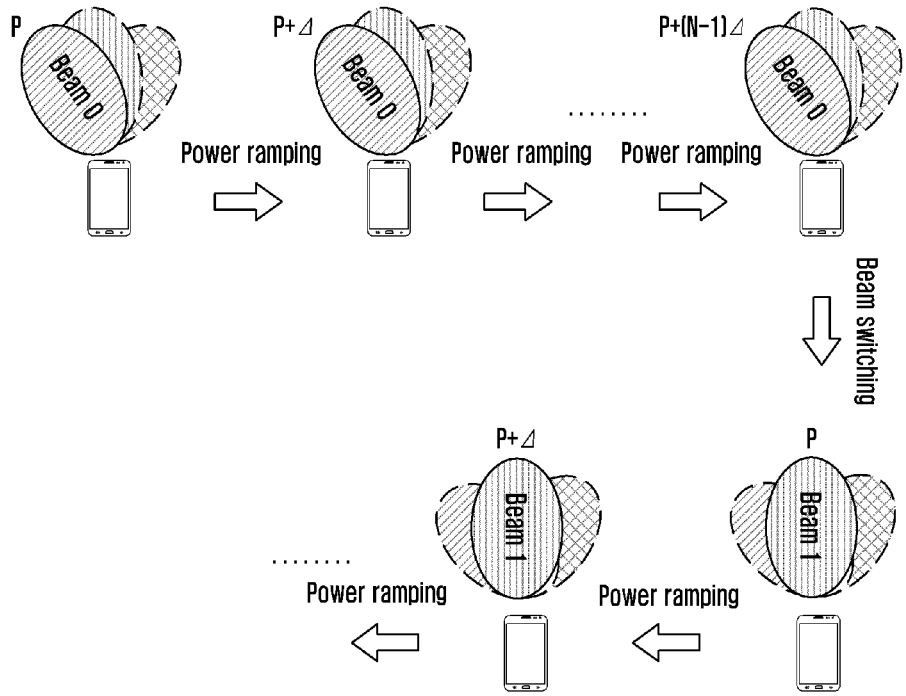

[Fig. 8]
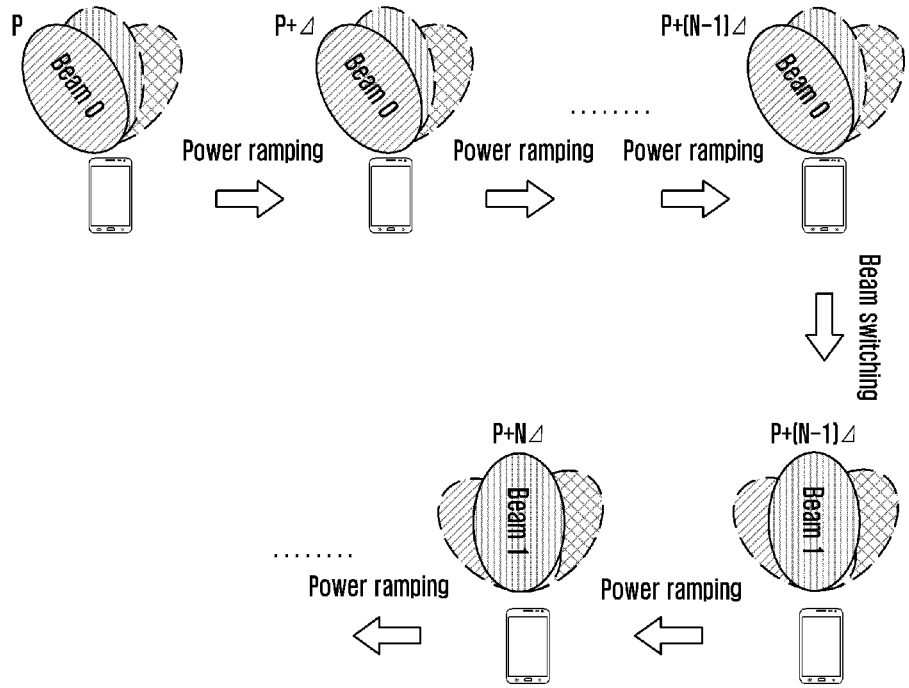
[Fig. 9]
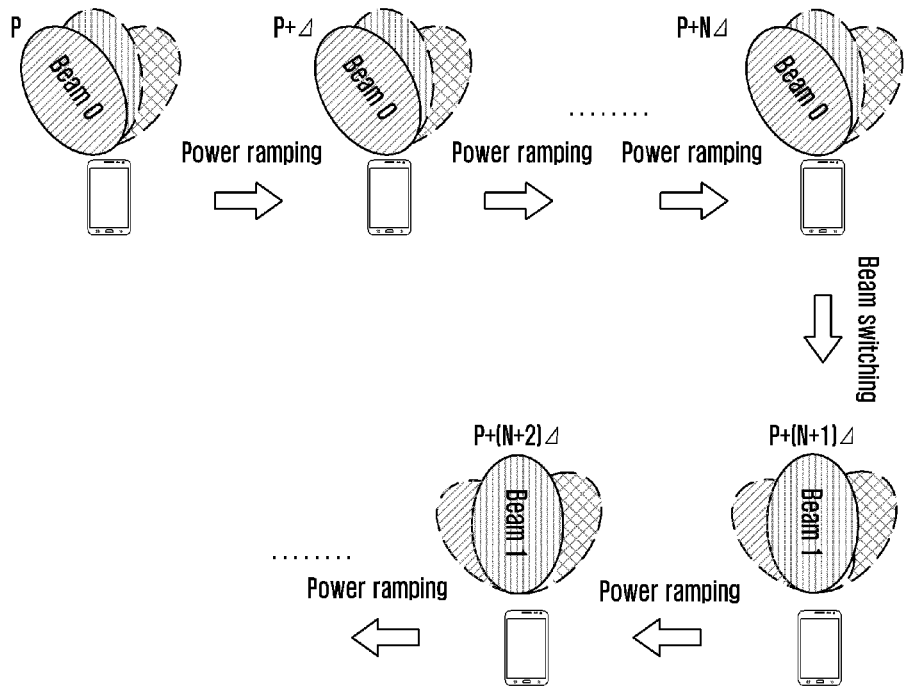

[Fig. 10]
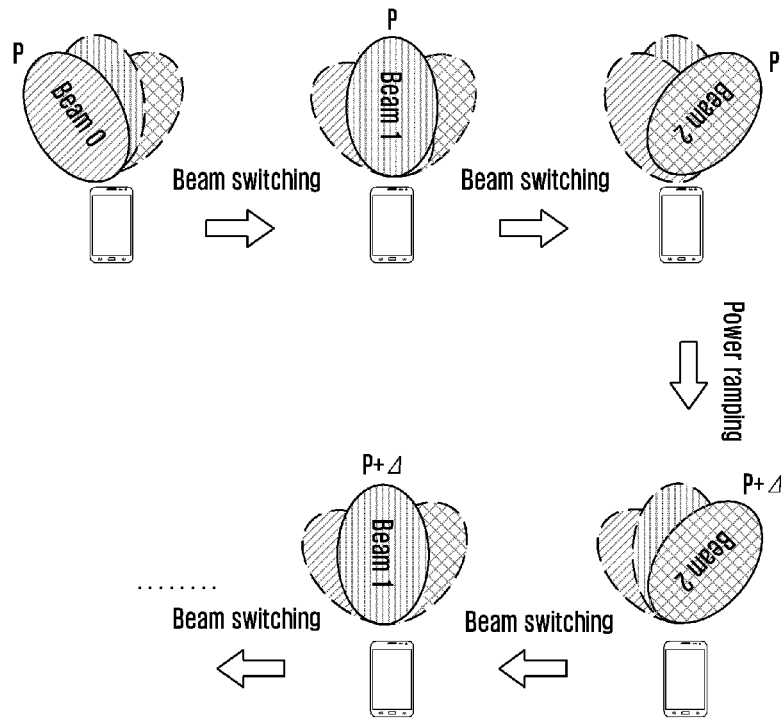
[Fig. 11]
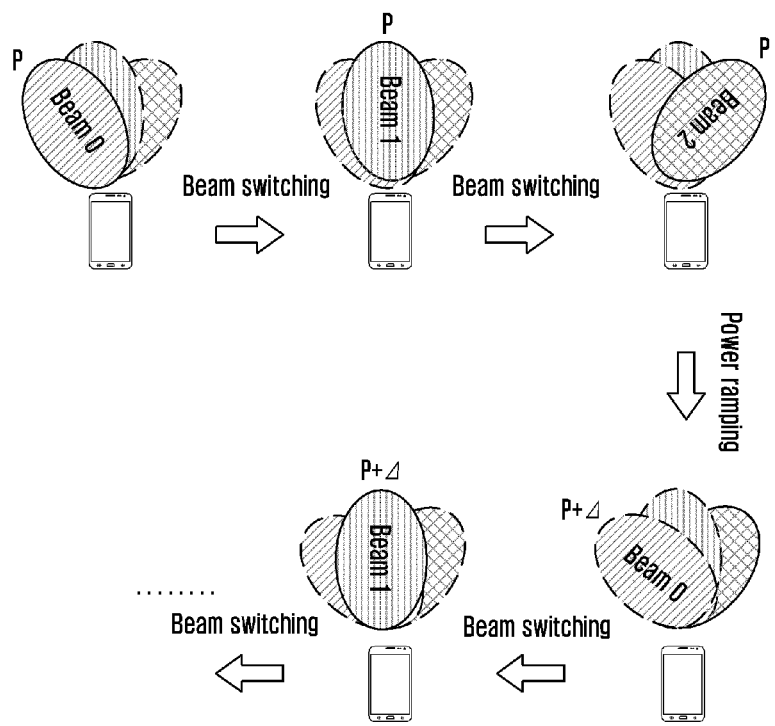

[Fig. 12]
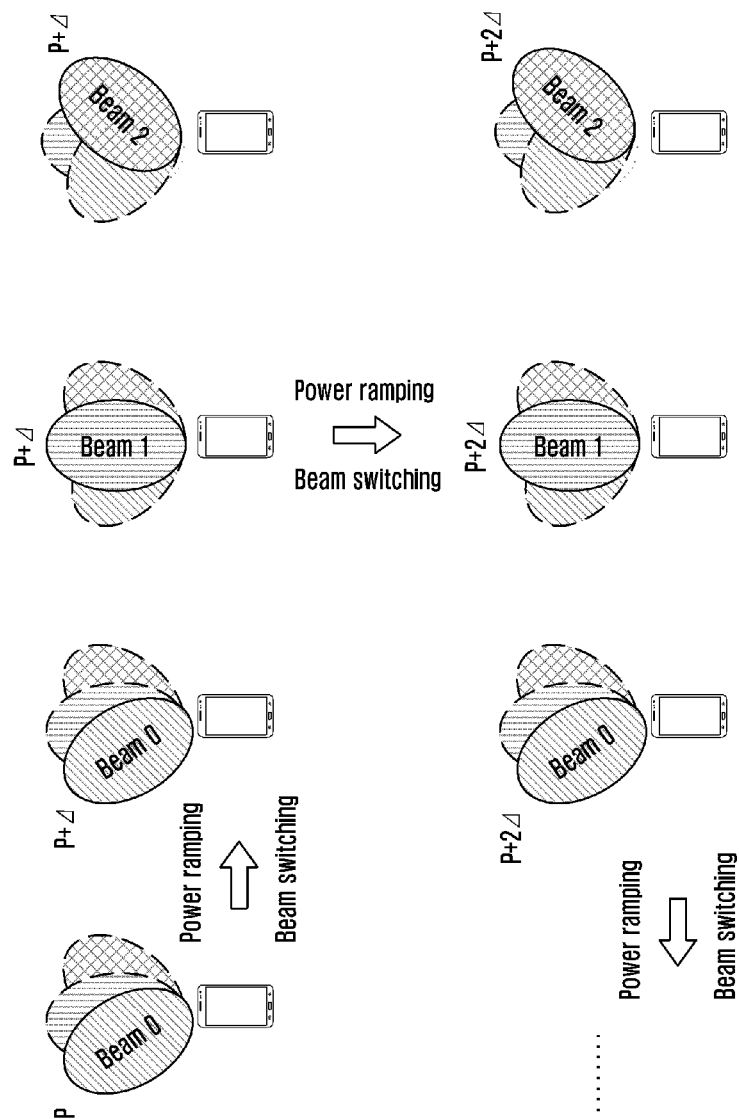

[Fig. 13a]
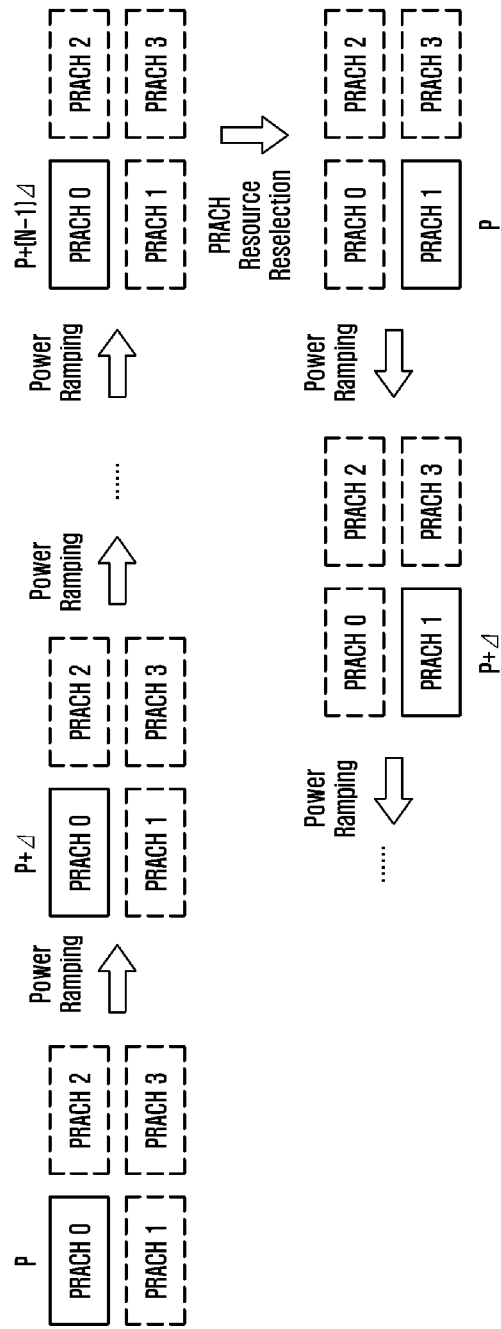

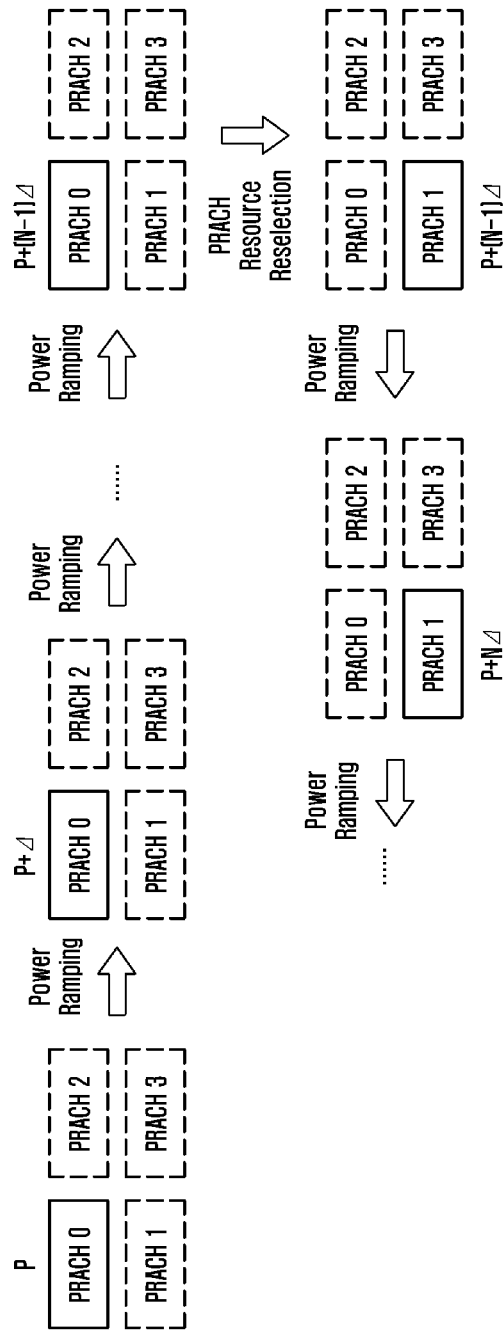
[Fig. 13b]

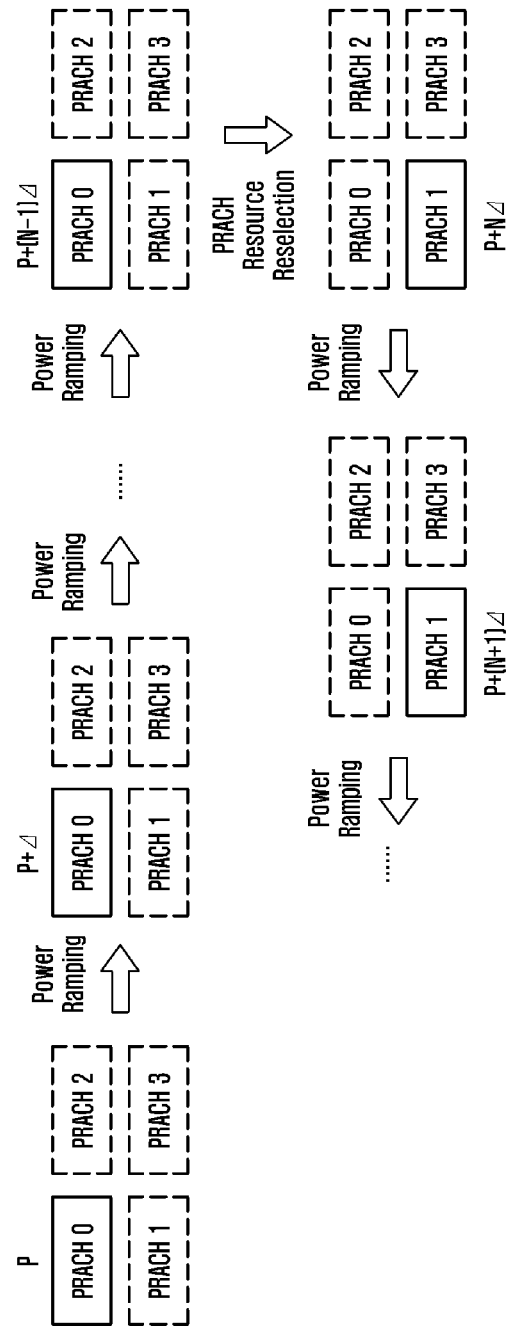
[Fig. 13c]

[Fig. 13d]
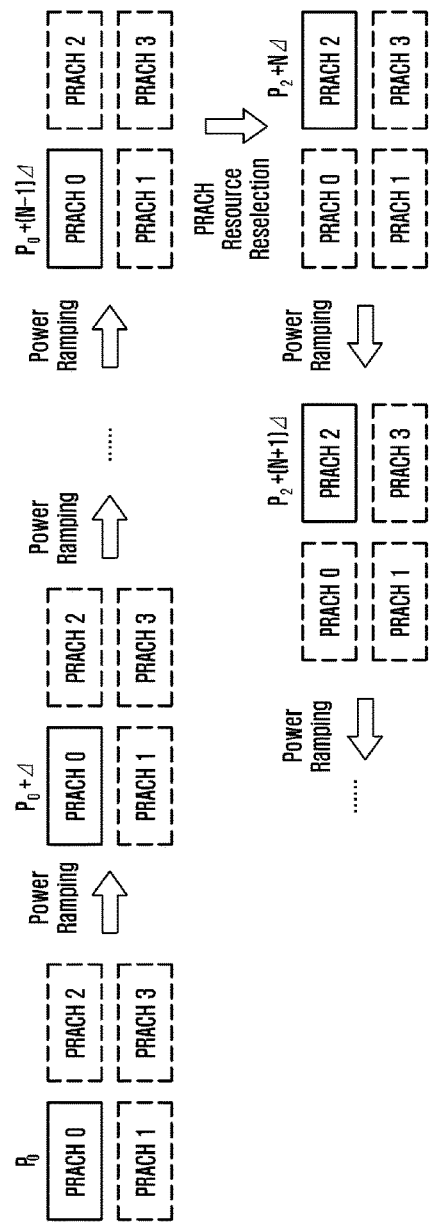
[Fig. 14]
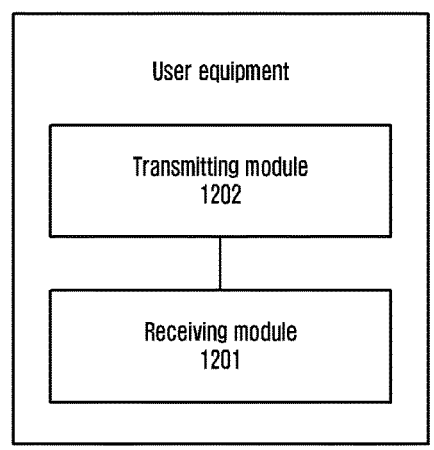

[Fig. 15]
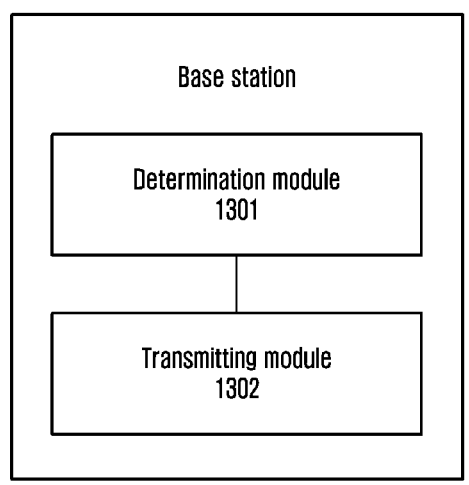

METHOD FOR RANDOM ACCESS, USER EQUIPMENT AND BASE STATION

CROSS-REFERENCE TO RELATED APPLICATIONS

This application is a 371 of International Application No. PCT/KR2017/014310 filed on Dec. 7, 2017, which claims priority to Chinese Patent Application No. 201710010607.1 filed on Jan. 6, 2017 and Chinese Patent Application No. 201710029432.9 filed on Jan. 16, 2017, the disclosures of which are herein incorporated by reference in their entirety.

BACKGROUND

1. Field

The present invention relates to the field of wireless communication, and particularly to a method for RACH re-attempt, a user equipment and a base station.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The rapid development of information industry, particularly the increasing demand from the mobile Internet and the Internet of Things (IoT), brings about unprecedented challenges in the future mobile communications technology. According to the ITU-R M. [IMT. BEYOND 2020. TRAFFIC] issued by the International Telecommunication Union (ITU), it can be expected that, by 2020, mobile service traffic will grow by nearly 1,000 times as compared with that in 2010 (4G era), and the number of user equipment connections will also be over 17 billion, and with a vast number of IoT equipments gradually expand into the mobile communication network, the number of connected equipments will be even more astonishing. In response to this unprecedented challenge, the communications industry and academia have prepared for 2020s by launching an extensive study of the fifth generation of mobile communications technology (5G). Currently, in ITU-R M. [IMT. VISION] from ITU, the framework and overall objectives of the future 5G have been discussed, where the demands outlook, application scenarios and various important performance indexes of 5G have been described in detail. In terms of new demands in 5G, the ITU-R M. [IMT. FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

A random access process is an important step in a wireless communication system, which is used to establish uplink synchronization between a user equipment and a base station, and used by a base station to allocate to a user equipment an ID for identifying the user equipment, or more. The performance of random access directly influences the user's experience. Wherein, for a traditional wireless communication system, for example, Long Term Evolution (LTE) or Long Term Evolution-Advanced (LTE-A), the random access process is used in various scenarios such as establishment of an initial link, cell handover, reestablishment of an uplink, Radio Resource Control (RRC) and connection reestablishment, and is classified into contention-based random access and contention-free random access, depending upon whether a user equipment exclusively occupies preamble sequence resources. Since, for the contention-based random access, each user equipment selects a preamble sequence from the same preamble sequence resources when attempting to establish an uplink, there may be a case in which a multiple of user equipments select and transmit a same preamble sequence to the base station. Consequently, the occurrence of such a collision may result in the failed transmission of the preamble sequence. How to design a method for RACH re-attempt and increase the probability of RACH re-attempt successfully is a key indicator that influences the performance of random access.

The contention-based random access process in LTE-A includes four steps, as shown in FIG. 1. Before the start of the random access process, the base station transmits configuration information of the random access process to the user equipment, and the user equipment performs the random access process according to the received configuration information. In the first step, the user equipment randomly selects one preamble sequence from a preamble sequence resource pool, and transmits the selected preamble sequence to the base station; and the base station performs correlation detection on the received signal to identify the preamble sequence transmitted by the user equipment. In the second step, the base station transmits a Random Access Response (RAR) to the user equipment, the RAR containing a random access preamble sequence identifier, a timing advance instruction determined according to a estimation of a time delay between the user equipment and the base station, a Temporary Cell-Radio Network Temporary Identifier (TC-RNTI), and time-frequency resources allocated for the user equipment to perform uplink transmission next time. In the third step, the user equipment transmits a Message 3 (MSg3) to the base station according to information in the RAR, the MSg3 containing information such as a user equipment terminal identifier and an RRC link request, wherein the user equipment terminal identifier is an identifier that is unique to a user equipment and used for resolving collision. In the fourth step, the base station transmits a collision resolution identifier to the user equipment, the collision resolution identifier containing an identifier corresponding to a user equipment who wins in the collision resolution. The user equipment upgrades TC-RNTI to Cell-Radio Network Temporary Identifier (C-RNTI) upon detecting its own identifier, and transmits an Acknowledgement (ACK) signal to the base station to complete the random access process and wait for the scheduling of the base station. Otherwise, the user equipment will start a new random access process after a certain delay.

It is to be noted that, in the first and second steps described above, the user equipment is expected to receive an RAR within one time window, wherein the configuration of the time window is decided by the base station, and transmit the RAR in configuration information before the start of the random access process. If the user equipment fails to receive an RAR within a set time window, the RACH re-attempt will be performed. On the other hand, if a preamble sequence number contained in all RARs received by the user equipment in the second step is different from a preamble sequence number transmitted in the first step, the RACH re-attempt will also be triggered. In addition, if the collision resolution in the fourth step fails, the RACH re-attempt will also be triggered.

For a contention-free random access process, since the base station has already known the identifier of the user equipment, it can allocate a preamble sequence to the user equipment. Thus, when transmitting a preamble sequence, the user equipment does not need to randomly select a sequence, and instead, it uses the allocated preamble sequence. Upon detecting the allocated preamble sequence, the base station will transmit a corresponding random access response, the random access response comprising information such as timing advance and uplink resource allocation. Upon receiving the random access response, the user equipment considers that the uplink synchronization has been completed, and waits for the further scheduling of the base station. Therefore, the initial access process and the contention-free random access process contain only two steps: a first step of transmitting a preamble sequence, and a second step of transmitting a random access response. Millimeter-wave communication is a possible key technique in 5G. By increasing the carrier frequency to the millimeter-wave band, the available bandwidth will be greatly increased. Thus, the transmission rate of the system can be significantly improved. To overcome properties such as high fading and high loss in wireless channels in the millimeter-wave band, beamforming is usually adopted in millimeter-wave communication systems. In other words, concentrating beam energy in a certain direction by using a weighting factor, during the wireless communication, the base station and the user equipment search for an optimal beam pair by means of polling or more, so that the received signal-to-noise ratio on both the base station side and the user equipment side is maximized. Since the user equipment and the base station have no idea of the direction of the optimal beam pair when an initial link is established, random access in the millimeter-wave communication systems encounters great challenges.

However, in a beamforming-based 5G wireless communication system, insufficient transmission power or unmatched transmitting beams may result in the failed random access. However, since it is during the random access process, the user equipment is unable to know the specific cause of failure.

In addition, in a random access process for existing 5G millimeter-wave communication, different flows and channel structures are separately designed, based on the presence or absence of the beam reciprocity. Under different channel reciprocity conditions, there has been no resolution about how to design a corresponding method for RACH re-attempt.

SUMMARY

To overcome or at least partially solve the above technical problems, the present invention proposes the following technical solutions.

According to one aspect, an embodiment of the present invention provides a method for RACH re-attempt, being performed by a user equipment, comprising the steps of:

receiving system configuration information transmitted by a base station, the system configuration information comprising PRACH resource configuration information and RACH re-attempt configuration information;

transmitting a preamble sequence to the base station to perform random access; and if the random access is failed, performing RACH re-attempt according to the received PRACH resource configuration information and RACH re-attempt configuration information to perform random access until a preset decision condition is satisfied.

According to one aspect, an embodiment of the present invention provides a method for RACH re-attempt, being performed by a base station, comprising the steps of:

determining system configuration information; and transmitting the system configuration information to a user equipment, the system configuration information comprising a PRACH resource configuration information and a RACH re-attempt configuration information.

According to another aspect, an embodiment of the present invention provides a user equipment, comprising:

a receiving module, configured to receive system configuration information transmitted by a base station, the system configuration information comprising a PRACH resource configuration information and a RACH re-attempt configuration information; and a transmitting module configured to transmit a preamble sequence to the base station to perform random access; and the transmitting module is further configured to, if the random access is failed, perform RACH re-attempt according to the received PRACH resource configuration information and RACH re-attempt configuration information to perform random access until a preset decision condition is satisfied.

According to another aspect, an embodiment of the present invention provides a base station, comprising:

a determination module configured to determine system configuration information; and a transmitting module configured to transmit the system configuration information to the user equipment, the system configuration information comprising a PRACH resource configuration information and a RACH re-attempt configuration information.

The present invention provides a method for RACH re-attempt, a user equipment and a base station. Compared with the prior art, the method of the present invention comprises the steps of: by a base station, determining system configuration information and transmitting the system configuration information to a user equipment; and then, by the user equipment, transmitting a preamble sequence to perform random access, and if the random access is failed, performing RACH re-attempt according to the received PRACH resource configuration information and RACH re-attempt configuration information to perform random access until a preset decision condition is satisfied. That is, the base station can transmit RACH re-attempt configuration information to the user equipment so that, after the random access is failed, the user equipment performs RACH re-attempt according to the above-described RACH re-attempt configuration information to perform random access. In this way, the user equipment can perform RACH re-attempt according to a RACH re-attempt solution.

Additional aspects and advantageous of the present invention will be appreciated and become apparent from the descriptions below, or will be well learned from the practice of the present invention.

According to embodiments of the following disclosures, an enhanced random access procedures can be performed in a beamforming based 5G wireless communication system. In addition, RACH re-attempt can be efficiently performed under different channel reciprocity conditions and/or beam reciprocity conditions.

BRIEF DESCRIPTION OF THE DRAWINGS

The above and/or additional aspects and advantages of the present invention will become apparent from and be more readily appreciated from the following description of embodiments taken with reference to the accompanying drawings, in which:

FIG. 1 is a schematic flowchart of traditional contention-based random access;

FIG. 2 is a schematic flowchart of a method for RACH re-attempt according to an embodiment of the present invention;

FIG. 3 is a schematic structure diagram of a transmitting end based on an antenna array;

FIG. 4 is a schematic direction diagram of beams specified by a user equipment;

FIG. 5 is a schematic structure diagram of a random access channel or sub-channel when the base station has beam reciprocity;

FIG. 6 is a schematic structure diagram of a random access channel or sub-channel when the base station has no beam reciprocity;

FIG. 7 is a schematic flowchart of power-ramping-first RACH re-attempt in which the preamble sequence transmission power returns to the first transmission power after beam switching;

FIG. 8 is a schematic flowchart of power-ramping-first RACH re-attempt in which the preamble sequence transmission power remains unchanged after beam switching;

FIG. 9 is a schematic flowchart of power-ramping-first RACH re-attempt in which the preamble sequence transmission power is increased after beam switching;

FIG. 10 is a schematic flowchart of beam-switching-first RACH re-attempt in which transmission is performed by using a same beam after the preamble sequence transmission power ramps;

FIG. 11 is a schematic flowchart of beam-switching-first RACH re-attempt in which transmission is performed by using a different beam after the preamble sequence transmission power ramps;

FIG. 12 is a schematic flowchart of RACH re-attempt combining preamble sequence transmission power ramping and power switching;

FIGS. 13A, 13B, 13C and 13D are schematic flowcharts of step 1109 in Embodiment 10 according to the present invention;

FIG. 14 is a schematic device structure diagram of the user equipment; and

FIG. 15 is a schematic device structure diagram of the base station.

DETAILED DESCRIPTION

Embodiments of the present invention will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

Wherein, in a beamforming-based wireless communication system, the failed random access may be resulted from two causes: insufficient transmission power and/or unmatched transmitting beams. With regard to the failed random access resulted from the two causes described above, in addition to the traditional power ramping method for RACH re-attempt, a beam switching method can also be used. In addition, RACH resource reselection method can also be used. The specific method for RACH re-attempt refers to the following embodiments.

Embodiment 1

An embodiment of the present invention provides a method for RACH re-attempt, as shown in FIG. 2, comprising the following steps.

S201: A base station determines system configuration information.

S202: The base station transmits the system configuration information to a user equipment.

Wherein, the system configuration information comprises a RACH re-attempt configuration information. In the embodiment of the present invention, the system configuration information may further comprise the format of a random access preamble sequence, and the configuration information of PRACH resources.

Wherein, the RACH re-attempt configuration information may comprise: maximum number of random access attempts, power ramping and beam switching steps, power ramping step, maximum number of transmissions for a single beam, maximum number of transmissions for a single power, beam switching rules.

In the embodiment of the present invention, the base station can classify the PRACH resources into two categories. Wherein, the first category of PRACH resources are corresponding PRACH resources when the user equipment has beam reciprocity, and the second category of PRACH resources are corresponding PRACH resources when the user equipment has no beam reciprocity.

In the embodiment of the present invention, the base station can use a transmission structure based on an antenna array as shown in FIG. 3, wherein each link passing through baseband processing is connected to an antenna array consisting of a multiple of antenna units via an up-converter and a digital-to-analog converter (DAC), each antenna in the antenna array can adjust the phase only, and by adjusting the phase, the antenna array can form beams in proper directions. In this way, the beamforming of the system is completed.

S203: The user equipment receives system configuration information transmitted by the base station.

S204: The user equipment transmits a preamble sequence to the base station to perform random access.

In the embodiment of the present invention, the user equipment selects, according to information about the beam reciprocity of the user equipment and the beam reciprocity of the base station, corresponding PRACH resources and the format of a random access preamble sequence from the formats of the received random access preamble sequences and the configuration information of the PRACH resources. In the embodiment of the present invention, the user equipment transmits, according to the corresponding PRACH resources and the format of the random access preamble sequence, a preamble sequence to the base station to perform random access.

Specifically, the user equipment transmits, according to the corresponding PRACH resources and the format of the random access preamble sequence and by a first transmission power and a first transmitting beam, a preamble sequence to the base station to perform random access.

S205: If the random access is failed, the user equipment performs RACH re-attempt according to the received RACH re-attempt configuration information until a preset decision condition is satisfied.

In the embodiment of the present invention, the user equipment can also use a transmission structure based on an antenna array, as shown in FIG. 3, to transmit a preamble sequence. In the embodiment of the present invention, in order to ensure the beam coverage, the user equipment specifies a multiple of beam directions in different orientations in advance. As shown in FIG. 4, the user equipment specifies four beams to realize the coverage of the space.

In the embodiment of the present invention, the system configuration information comprises a receiving time window for a random access response.

In the embodiment of the present invention, the failed random access comprises at least one of the following:

(1) The user equipment fails to receive random access response information transmitted by the base station within the receiving time window for the random access response.

(2) The user equipment receives random access response information transmitted by the base station within the receiving time window for the random access response, but an identifier of a preamble sequence carried in the random access response information is different from an identifier corresponding to a preamble sequence transmitted by the user equipment to the base station.

In the embodiment of the present invention, the base station detects a preamble sequence on corresponding time-frequency resources, and if the base station detects the random access, the base station transmits a Random Access Response (RAR) on corresponding downlink time-frequency resources according to the detected preamble sequence, the time-frequency resources where the preamble sequence is located, and the detected Timing Advance (TA). Wherein, the RAR contains information such as the detected preamble sequence identifier, a random access channel time-frequency resource information, TA information, and the allocated Cell-Radio Network Temporary Identifier (C-RNTI). Wherein, if all the received random access responses do not contain an identifier corresponding to the preamble sequence transmitted in the S204, it is indicated that the random access is failed.

(3) The user equipment receives random access response information transmitted by the base station within the receiving time window for the random access response and an identifier of a preamble sequence carried in the random access response information is the same as an identifier corresponding to a preamble sequence transmitted by the user equipment to the base station, but a user equipment identifier carried in collision resolution information received by the user equipment is different from the corresponding identifier.

In the embodiment of the present invention, if the user equipment detects that the random access channel time-frequency resources and the preamble sequence contained in the random access response are consistent to the random access channel resources and the preamble sequence used in the S204, then Msg3 is transmitted, where the Msg3 containing information such as a user equipment identifier and an RRC link request. Then, the base station transmits a collision resolution identifier, wherein, the collision resolution identifier being an identifier corresponding to a user equipment who wins in the collision resolution. If the collision resolution identifier is not an identifier of a user equipment receiving this collision resolution identifier, it is indicated that the random access is failed.

In the embodiment of the present invention, the preset decision condition can be maximum number of random access attempts or successful random access.

In the embodiment of the present invention, if the random access is failed, the user equipment can perform RACH attempt in the following at least three re-attempt ways. In the embodiment of the present invention, the three re-attempt ways mentioned above are respectively: power-ramping-first RACH re-attempt, beam-switching-first RACH re-attempt, and RACH re-attempt combing power ramping and beam switching.

Wherein, the power-ramping-first RACH re-attempt will be specifically described below. During the RACH re-attempt, the user equipment can use a power ramping mechanism first, that is, the user equipment can perform RACH re-attempt using an initial beam by increasing the transmission power by a fixed step. When the maximum number of re-attempt for this beam is reached or the maximum transmission power is reached or other conditions preset by the user equipment are satisfied, the user equipment switches transmitting beam and repeats the above power ramping mechanism by the new beam, and when the maximum number of re-attempt for this new beam is reached or the maximum transmission power is reached, the user equipment performs beam switching. If the maximum number of random access attempts is reached, the random access process is stopped. Wherein, after beam switching, the user equipment can set the transmission power to an initial transmission state to perform RACH attempt on the new beam using the initial transmission power, and configure a power ramping mechanism in the possible subsequent re-attempts or maintain the power ramping mechanism of the original beam, keep the original power unchanged or increasing the original transmission power by a preset number of steps, perform RACH attempt on the new beam.

Wherein, the beam-switching-first RACH re-attempt will be specifically described below. The user equipment can also use a beam switching mechanism first. During the RACH re-attempt, the user equipment keeps the transmission power unchanged and transmits the preamble sequence using a new beam. When the maximum number of transmissions for this power is reached or all beams are traversed, the user equipment increases the transmission power and repeats the beam switching mechanism at the new power, and when the maximum number of transmissions for this new power is reached or all beams are traversed or other conditions set by the user are satisfied, the user equipment increases the transmission power again. Wherein, during the RACH re-attempt, if the maximum number of random access attempts is reached, the random access process is stopped.

Wherein, the RACH re-attempt combing power ramping and beam switching will be specifically described below. The user equipment can also use a beam switching mechanism and a beam switching mechanism simultaneously. During the RACH re-attempt, the user equipment transmits the preamble sequence in turn using a number of beams including an initial beam. During RACH re-attempt, such a multi-beam transmission mode is used until the random access process is stopped when the maximum number of random access attempts is reached or the preamble sequence is transmitted successfully. Wherein, both the power of the initial beam and the new beam adopt the power ramping mechanism with an equal step, and the transmission power for the RACH re-attempt by the new beam can be the same as that by the initial beam. Or, an independent power ramping mechanism can be configured for each of them.

In the embodiment of the present invention, whether the user equipment and the base station have beam reciprocity directly influences the structure of the random access channel.

In the embodiment of the present invention, if the user equipment has beam reciprocity, the random access channel consists of a single random access sub-channel only; and if the user equipment has no beam reciprocity, the random access channel consists of a single or a multiple of random access sub-channels.

In the embodiment of the present invention, if the base station has beam reciprocity, the base station can determine an optimal beam direction for the base station by the correspondence between a downlink synchronization signal and the random access channel. Therefore, instead of determining a beam direction by means of beam scanning, the base station only needs to specify the correspondence between the downlink synchronization signal and the random access channel and then determine an optimal beam direction on the base station side by this correspondence. In this case, it is unnecessary to transmit a preamble sequence for random access repeatedly. As shown in FIG. 5, a possible random access channel structure is introduced. In FIG. 5, the random access channel consists of a Cyclic Prefix (CP), a single preamble sequence, and a possible guard time.

In the embodiment of the present invention, if the base station has no beam reciprocity, the base station needs to determine an optimal receiving beam direction on the base station side by means of beam scanning, and requires the user to indicate an optimal transmitting beam on the base station side when the user transmits the preamble sequence. Wherein, it is necessary to transmit the preamble sequence repeatedly so that the base station receives the preamble sequence by means of beam scanning. As shown in FIG. 6, a possible random access channel or random access sub-channel structure is introduced. Wherein, as shown in FIG. 6, one random access channel consists of a CP, a preamble sequence consisting of one or more sub-sequences, and a possible guard time. Wherein, the repeat number of the sub-sequences is related to the beam direction to be scanned on the base station side.

In the embodiment of the present invention, during the transmission and RACH re-attempt, the user equipment uses the random access channel or random access sub-channel structure described above.

The embodiment of the present invention provides a method for RACH re-attempt. Compared with the prior art, the method of the present invention comprises the steps of: by a base station, determining system configuration information and transmitting the system configuration information to a user equipment; and then, by the user equipment, transmitting a preamble sequence to perform random access, and if the random access is failed, performing RACH re-attempt according to the received RACH re-attempt configuration information to perform random access until a preset decision condition is satisfied. That is, the base station can transmit RACH re-attempt configuration information to the user equipment so that, after the random access is failed, the user equipment performs RACH re-attempt according to the above-described RACH re-attempt configuration information to perform random access. In this way, the user equipment can perform RACH re-attempt according to a RACH re-attempt solution.

Embodiment 2

As another possible implementation of the embodiments of the present invention, the RACH re-attempt configuration information comprises a power ramping step. On the basis of what has been shown in Embodiment 1, the S205 of, if the random access is failed, by the user equipment, performing RACH re-attempt according to the received RACH re-attempt configuration information to perform random access until the preset decision condition is satisfied, comprises S305 and/or S306 to be shown in Embodiment 2, wherein the operations performed in the S301 to S304 are similar to the operations performed in the S201 to S204 and will not be repeated herein.

S305: If the random access is failed, the user equipment increases a transmission power for transmitting a preamble sequence by a preset power ramping step to perform random access.

S306: If a transmitting beam for a preamble sequence changes, and/or the PRACH resource changes, the user equipment adjusts a transmission power for transmitting the preamble sequence by a preset power to perform random access until the preset decision condition is satisfied.

Embodiment 3

As another possible implementation of the embodiments of the present invention, on the basis of what has been shown in Embodiment 2, the S305 of, if the random access is failed, by the user equipment, increasing a transmission power for transmitting a preamble sequence by a preset power ramping step to perform random access; and/or the S306 of, if a transmitting beam for a preamble sequence changes, and/or the PRACH resource changes, by the user equipment, adjusting a transmission power for transmitting the preamble sequence by a preset power to perform random access until the preset decision condition is satisfied, comprises S405 to S410 to be shown in Embodiment 3, wherein the operations performed in the S401 to S404 are similar to the operations performed in the S301 to S304 and will not be repeated herein.

S405: If the random access is failed, the user equipment determines a second transmission power, and performs RACH attempt by the first beam and the second transmission power.

Wherein, the second transmission power is a transmission power based on the first transmission power with a preset power ramping step, and the first transmission power is a transmission power for transmitting the preamble sequence for the first time.

In the embodiment of the present invention, before transmitting the preamble sequence, the user equipment needs to determine a preambleInitialReceivedTargetPower and a DELTA_PREAMBLE, in order to determine the first transmission power.

Wherein, the first transmission power=preambleInitialReceivedTargetPower+DELTA_PREAMBLE, where DELTA_PREAMBLE is a preamble format based power offset value.

In the embodiment of the present invention, before transmitting the preamble sequence, the user equipment sets the PREAMBLE_TRANSMISSION_COUNTER as 1 and PREAMBLE_TRANSMISSION_POWER_COUNTER as 1.

S406: If the random access is failed, the user equipment increases a transmission power for transmitting a preamble sequence by a preset power ramping step and performs RACH re-attempt by the increased preamble sequence transmission power and the first beam.

In the embodiment of the present invention, the user equipment receives a random access response within a receiving time window for a random access response, which is specified in the system configuration information. Wherein, if no random access response is received within this time window, or an identifier of a preamble sequence carried in the random access response information is different from an identifier corresponding to a preamble sequence transmitted by the user equipment to the base station, or if a user equipment identifier carried in collision resolution information is different from the corresponding identifier, the PREAMBLE_TRANSMISSION_COUNTER is increased by 1 to obtain the current PREAMBLE_TRANSMISSION_COUNTER_1.

Wherein, if
PREAMBLE_TRANSMISSION_COUNTER_1= preambleTransMax+1, the maximum number of random access attempts is reached. It is considered that the random access process is failed. The random access process ends.

PREAMBLE_TRANSMISSION_COUNTER_ 1<preambleTransMax+1, the PREAMBLE_TRANSMISSION_POWER_COUNTER is increased by 1 to obtain PREAMBLE_TRANSMISSION_POWER_COUNTER_1, and then the RACH re-attempt is performed, wherein the PREAMBLE_RECEIVED_TARGET_POWER is set as: preambleInitialReceivedTargetPower+DELTA_PREAMBLE+(PREAMBLE_TRANSMISSION_POWER_COUNTER_1-1)*power Ramping Step, where power Ramping Step is a power ramping factor.

In the embodiment of the present invention, if the transmission of the preamble sequence is failed, the user equipment can increase the transmission power for the preamble sequence to transmit the preamble sequence.

S407: The S406 is cycled until the first preset condition is satisfied.

Wherein, the first preset condition can comprise at least one of the following: maximum number of transmissions for each beam, successful random access, maximum transmission power, or conditions preset by a user equipment.

S408: If the random access is failed, the user equipment reselects any one beam from other selectable beams as a second transmitting beam.

In the embodiment of the present invention, the user specifies four beam transmission directions in advance, respectively: the first beam transmission direction, the second beam transmission direction, the third beam transmission direction and the fourth beam transmission direction.

S409: The user equipment re-determines a transmission power as a third transmission power.

Wherein, the S408 can be performed prior to the S409; or the S409 can be performed prior to the S408; or the S408 and the S409 can be performed simultaneously. It is not limited in the embodiment of the present invention.

S410: The user equipment performs RACH re-attempt by the third transmission power and the second transmitting beam to perform random access.

In the embodiment of the present invention, if the user equipment previously transmits the preamble sequence in the first beam transmission direction and by gradually increasing the transmission power until the first preset condition is satisfied, then, the user equipment can use other beams, for example, the second beam transmission direction, and the re-determined transmission power.

S411: If the random access is failed, the user equipment gradually increases a transmission power for transmitting a preamble sequence by a preset power ramping step, and performs RACH re-attempt by the increased transmission power and the second transmitting beam to perform random access.

In the embodiment of the present invention, if the random access is failed, the user equipment performs RACH re-attempt in the selected second beam transmission direction and by gradually increasing the transmission power for transmitting the preamble sequence on the basis of the transmission power for transmitting the preamble sequence last time.

S412: If the random access is failed and the first preset condition is satisfied, the S408 to S411 are cycled until the preset decision condition is satisfied.

In the embodiment of the present invention, if the random access to the base station in the second beam transmission direction is still failed, and the maximum number of transmissions for the second beam transmission direction is reached or the maximum transmission power is reached, the user equipment transmits the preamble sequence to the base station in the third beam transmission direction and by gradually increasing the transmission power for transmitting the preamble sequence. If it is failed, and the maximum number of transmissions for the third beam transmission direction is reached or the maximum transmission power is reached, the user equipment transmits the preamble sequence to the base station in the fourth beam transmission direction and by the above-described power increasing method, until the random access is successful or the maximum number of random access attempts is reached.

It is to be noted that, when performing the above-described beam switching operation, the user equipment can select one beam from all beams or a subset thereof according to certain rules, or can randomly select one beam from all beams or the subset thereof. In the embodiment of the present invention, in the RACH re-attempt process based on power ramping and beam switching, if the preamble sequence is transmitted successfully, the random access is stopped, and the subsequent random access process is performed. Otherwise, the preamble RACH attempt is performed continuously until the maximum number of random access attempts is reached.

In the embodiment of the present invention, after the random access is failed, the user equipment increases the transmission power for the preamble sequence first, then switches the transmitting beam for transmitting the preamble sequence, and increases the transmission power for transmitting the preamble sequence in the switched beam until the preamble sequence is transmitted successfully to the base station or the preset decision condition is satisfied. In this way, the probability of RACH re-attempt successfully can be increased, and further, the performance of the random access process can be improved.

Embodiment 4

As another possible implementation of the embodiments of the present invention, on the basis of what has been shown in Embodiment 2, the S409 of, by the user equipment, re-determining a transmission power as a third transmission power, comprises S509 to be shown in Embodiment 4, wherein the operations performed in the S501 to S508 and in the S510 to S512 are similar to the operations performed in the S401 to S408 and in the S410 to S412 and will not be repeated herein.

S509: The user equipment re-determines a third transmission power as the first transmission power.

In the embodiment of the present invention, the user equipment performs a beam switching operation, sets the PREAMBLE_TRANSMISSION_POWER_COUNTER as 1, and increases the PREAMBLE_TRANSMISSION_COUNTER by 1 to obtain the current PREAMBLE_TRANSMISSION_COUNTER_2.

Wherein, if

PREAMBLE_TRANSMISSION_COUNTER_ 2<preambleTransMax+1, the RACH re-attempt is performed by the new beam, the PREAMBLE_TRANSMISSION_POWER_COUNTER is reset as 1, the preambleInitialReceivedTargetPower and the DELTA_PREAMBLE are kept unchanged, and the transmission power for the preamble sequence is as follows:

preambleInitialReceivedTargetPower+DELTA_PREAMBLE+(PREAMBLE_TRANSMISSION_POWER_COUNTER−1)*power Ramping Step.

For example, the sum of the preamble Initial Received Target Power and the DELTA_PREAMBLE is P. That is, the first transmission power is P, the power Ramping Step is Δ, and the first transmitting beam is 0. In this case, the flowchart of the RACH re-attempt is shown in FIG. 7. Wherein, in FIG. 7, the user equipment transmits the preamble sequence by the beam 0 and the initial power P, and configures a power ramping mechanism with a step of Δ when random access fails. When the number of transmissions of the preamble sequence by the beam 0 reaches N and if it is necessary to perform RACH re-attempt again, the user equipment selects the beam 1 after performing the beam switching operation to perform RACH re-attempt by the beam 1 and the initial power P, and configures the above-described power ramping mechanism in the beam 1. When the beam switching is performed again or the preamble sequence is transmitted successfully or the maximum number of random access attempts is reached, the random access process ends.

Embodiment 5

As another possible implementation of the embodiments of the present invention, on the basis of what has been shown in Embodiment 3, the S409 of, by the user equipment, re-determining a transmission power as a third transmission power, comprises S609 to be shown in Embodiment 5, wherein the operations performed in the S601 to S608 and in the S610 to S612 are similar to the operations performed in the S401 to S408 and in the S410 to S412 and will not be repeated herein.

S609: The user equipment re-determines the third transmission power as a power for transmitting the preamble sequence when the first preset condition is satisfied.

In the embodiment of the present invention, the user equipment performs a beam switching operation, keeps the PREAMBLE_TRANSMISSION_POWER_COUNTER unchanged, and increases the PREAMBLE_TRANSMISSION_COUNTER by 1 to obtain the current PREAMBLE_TRANSMISSION_COUNTER_3.

Wherein, if PREAMBLE_TRANSMISSION_COUNTER_3<preambleTransMax+1, the RACH re-attempt is performed by the new beam, the PREAMBLE_RECEIVED_TARGET_POWER is set as follows:

preambleInitialReceivedTargetPower+DELTA_PREAMBLE+(PREAMBLE_TRANSMISSION_POWER_COUNTER−1)*power Ramping Step.

For example, the sum of the preamble Initial Received Target Power and the DELTA_PREAMBLE is P. That is, the first transmission power is P and the power Ramping Step is Δ. In this case, the flowchart of the RACH re-attempt is shown in FIG. 8, wherein the user equipment transmits the preamble sequence by the beam 0 and the initial power P, and configures a power ramping mechanism with a step of Δ when random access fails. When the number of transmissions of the preamble sequence by the beam 0 reaches N and if it is necessary to perform RACH re-attempt again, the user equipment selects the beam 1 after performing the beam switching operation to perform RACH re-attempt by the beam 1 and the power P+(N−1)Δ, and configures the above-described power ramping mechanism in the beam 1. When the beam switching is performed again or the preamble sequence is transmitted successfully or the maximum number of random access attempts is reached, the random access process ends.

Embodiment 6

As another possible implementation of the embodiments of the present invention, on the basis of what has been shown in Embodiment 3, the S409 of, by the user equipment, re-determining a transmission power as a third transmission power, comprises S709 to be shown in Embodiment 6, wherein the operations performed in the S701 to S708 and in the S710 to S712 are similar to the operations performed in the S401 to S408 and in the S410 to S412 and will not be repeated herein.

S709: when the first preset condition is satisfied, a power for transmitting the preamble sequence is increased by a preset power ramping step, and a power obtained by increasing by a preset power ramping step is used as the third transmission power.

In the embodiment of the present invention, the user equipment performs a beam switching operation, increases each of the PREAMBLE_TRANSMISSION_POWER_COUNTER and the PREAMBLE_TRANSMISSION_COUNTER by 1 to obtain the PREAMBLE_TRANSMISSION_POWER_COUNTER_2 and the PREAMBLE_TRANSMISSION_COUNTER_4, respectively.

Wherein, if PREAMBLE_TRANSMISSION_COUNTER_4<preambleTransMax+1, the RACH re-attempt is performed by the new beam, the PREAMBLE_RECEIVED_TARGET_POWER is set as follows:

preambleInitialReceivedTargetPower+DELTA_PREAMBLE+(PREAMBLE_TRANSMISSION_POWER_COUNTER_2−1)*powerRampingStep.

For example, the sum of the preamble Initial Received Target Power and the DELTA_PREAMBLE is P. That is, the first transmission power is P and the power Ramping Step is Δ. In this case, the flowchart of the RACH re-attempt is shown in FIG. 9, wherein the user equipment transmits the preamble sequence by the beam 0 and the initial power P, and configures a power ramping mechanism with a step of Δ when random access fails. When the number of transmissions of the preamble sequence by the beam 0 reaches N and if it is necessary to perform RACH re-attempt again, the user equipment selects the beam 1 after performing the beam switching operation to perform RACH re-attempt by the beam 1 and the power P+NΔ, and configures the above-described power ramping mechanism in the beam 1. When the beam switching is performed again or the preamble sequence is transmitted successfully or the maximum number of random access attempts is reached, the random access process ends.

Embodiment 7

As another possible implementation of the embodiments of the present invention, on the basis of what has been shown in Embodiment 1, the step 205 of, if the random access is failed, performing RACH re-attempt by the user equipment according to the received RACH re-attempt configuration information to perform random access until the preset decision condition is satisfied, comprises S805 to S810 to be shown in Embodiment 7, wherein the operations performed in the S801 to S804 are similar to the operations performed in the S201 to S204 and will not be repeated herein.

S805: If the random access is failed, the user equipment selects any one beam from other selectable beams as a third transmitting beam, and performs RACH re-attempt to the base station by the first transmission power and the third transmitting beam to perform random access.

It is to be noted that, the other selectable beams are selectable beams other than the used beams in a single cycle.

In the embodiment of the present invention, before transmitting the preamble sequence, the user equipment needs to determine the preamble Initial Received Target Power and the DELTA_PREAMBLE in order to determine the first transmission power.

Wherein, the first transmission power=preambleInitialReceivedTargetPower+DELTA_PREAMBLE.

In the embodiment of the present invention, before transmitting the preamble sequence, the user equipment sets the PREAMBLE_TRANSMISSION-COUNTER as 1 and the PREAMBLE_TRANSMISSION_POWER_COUNTER as 1.

In the embodiment of the present invention, the user equipment receives a random access response within a receiving time window for a random access response, which is specified in the system configuration information. Wherein, if no random access response is received within this time window, or an identifier of a preamble sequence carried in the random access response information is different from an identifier corresponding to a preamble sequence transmitted by the user equipment to the base station, or a user equipment identifier carried in collision resolution information is different from the corresponding identifier, the PREAMBLE_TRANSMISSION_COUNTER is increased by 1 to obtain the PREAMBLE_TRANSMISSION_COUNTER_5.

Wherein, if PREAMBLE_TRANSMISSION_COUNTER_5=preambleTransMax+1, the maximum number of random access attempts is reached. It is considered that the random access process is failed. The random access process ends.

Wherein, if PREAMBLE_TRANSMISSION_COUNTER_5<preambleTransMax+1, a transmitting beam is reselected to transmit the preamble sequence, the PREAMBLE_RECEIVED_TARGET_POWER is set as follows:

preambleInitialReceivedTargetPower+DELTA_PREAMBLE+(PREAMBLE_TRANSMISSION_POWER_COUNTER−1)*powerRampingStep.

In the embodiment of the present invention, when performing the beam switching operation to perform RACH re-attempt to the base station, the user equipment can select one beam from all beams or a subset thereof according to certain rules, or can randomly select one beam from all beams or the subset thereof. If the user equipment needs to perform RACH re-attempt in the subsequent random access process, the above-described beam switching mechanism can be repeated, and the preamble sequence is transmitted by the original power and a different beam. For example, if the random access is failed, and the current value of PREAMBLE_TRANSMISSION_COUNTER< preambleTransMax+1, one beam is selected from other unused selectable beams, and the RACH re-attempt is performed by the first transmission power.

S806: if the random access is failed, the S805 is cycled until the second preset condition is reached.

Wherein, the second preset condition can comprise at least one of the following: maximum number of transmissions for the original power, maximum number of beams, successful random access, and conditions set by a user equipment. In an embodiment of the present invention, when the maximum number of transmissions for the original power is reached, or the maximum number of beams is reached, or other conditions set by the user are satisfied, the user equipment increases the transmission power to the RACH re-attempt is performed, and repeats the above-described beam switching mechanism at the new transmission power, as shown in S807 to S810.

In the embodiment of the present invention, when the maximum number of transmissions for the original power is reached, or the maximum number of beams is reached, or other conditions set by the user are satisfied, the PREAMBLE_TRANSMISSION_POWER_COUNTER is increased by 1 to obtain the current PREAMBLE_TRANSMISSION_POWER_COUNTER_3, then the current PREAMBLE_RECEIVED_TARGET_POWER is set as preambleInitialReceivedTargetPower+DELTA_PREAMBLE+(PREAMBLE_TRANSMISSION_POWER_COUNTER_3−1)*powerRampingStep, and the RACH re-attempt is performed by the current transmission power for the preamble sequence.

S807: If the random access is failed, the user equipment re-determines a transmission power and a transmitting beam each as a fourth transmission power and a fourth transmitting beam.

S808: The user equipment performs RACH re-attempt by the fourth transmission power and the fourth transmitting beam to perform random access.

S809: If the random access is failed, the user equipment selects any one beam from other selectable beams, and performs RACH re-attempt by the selected beam to perform random access.

S810: If the random access is failed and the second preset condition is satisfied, the S807 to S809 are cycled until the preset decision condition is satisfied.

In the embodiment of the present invention, after the random access to the base station is failed, the user equipment switches the transmitting beam for transmitting the preamble sequence first and then increases the transmission power for the preamble sequence until the preamble sequence is transmitted successfully to the base station or the preset decision condition is satisfied. In this way, the probability of RACH re-attempt successfully can be increased, and further, the performance of the random access process can be improved.

Embodiment 8

As another possible implementation of the embodiments of the present invention, on the basis of what has been shown in Embodiment 7, the S807 of, by the user equipment, re-determining a transmission power and a transmitting beam each as a fourth transmission power and a fourth transmitting beam, comprises S907 shown in Embodiment 8, wherein the operations performed in the S901 to S906 and in the S908 to S911 are similar to the operations performed in the S801 to S806 and in the S808 to S810 and will not be repeated herein.

S907: The user equipment determines, as the fourth transmission power, a transmission power based on a corresponding transmission power with a preset power ramping step when the second preset condition is satisfied, and determines, as the fourth transmitting beam, any one transmitting beam selected from the selectable beams.

In the embodiment of the present invention, when the second preset condition is satisfied, the user equipment increases the PREAMBLE_TRANSMISSION_POWER_COUNTER by 1 to obtain the current PREAMBLE_TRANSMISSION_POWER_COUNTER_4, wherein the PREAMBLE_RECEIVED_TARGET_POWER is set as preambleInitialReceivedTargetPower+DELTA_PREAMBLE+(PREAMBLE_TRANSMISSION_POWER_COUNTER_4−1)*powerRampingStep.

In the embodiment of the present invention, the fourth transmitting beam can be the same as a transmitting beam for transmitting the preamble sequence when the second preset condition is satisfied, or the fourth transmitting beam is different from a transmitting beam for transmitting the preamble sequence when the second preset condition is satisfied. It is not limited in the embodiment of the present invention.

Wherein, if the fourth transmitting beam is the same as a transmitting beam for transmitting the preamble sequence when the second preset condition is satisfied, the preamble sequence can be transmitted to the base station in the following way. For example, the sum of the preambleInitialReceivedTargetPower and the DELTA_PREAMBLE is P, and the powerRampingStep is Δ. In this case, the flowchart of the RACH re-attempt is shown in FIG. 10. Wherein, the user equipment configures three transmitting beam directions, transmits the preamble sequence by the beam 0 and the initial power P, and configures a beam switching mechanism when random access fails. When the RACH re-attempt is performed by the beam 1 and beam 2 and the power P and if it is necessary to perform RACH re-attempt again, the user equipment continuously uses the beam 2 after performing the power ramping operation to r perform RACH re-attempt by the beam 2 and a power P+Δ, and configures the above-described beam switching mechanism at the power P+Δ. When the power ramping is performed again or the preamble sequence is transmitted successfully or the maximum number of random access attempts is reached, the random access process ends.

Wherein, if the fourth transmitting beam is different from a transmitting beam for transmitting the preamble sequence when the second preset condition is satisfied, the preamble sequence can be transmitted to the base station in the following way. For example, the sum of the preambleInitialReceivedTargetPower and the DELTA_PREAMBLE is P, and the powerRampingStep is Δ. In this case, the flowchart of the RACH re-attempt is shown in FIG. 11. Wherein, the user equipment configures three beam directions, transmits the preamble sequence by the beam 0 and the initial power P, and configures a beam switching mechanism when random access fails. When the RACH re-attempt is performed by the beam 1 and beam 2 and the power P and if it is necessary to perform RACH re-attempt again, the user equipment uses a different beam 0 after performing the power ramping operation to perform RACH re-attempt by the beam 0 and a power P+Δ, and configures the above-described beam switching mechanism at the power P+Δ. When the power ramping is performed again or the preamble sequence is transmitted successfully or the maximum number of random access attempts is reached, the random access process ends.

It is to be noted that, in the RACH re-attempt process based on power ramping and beam switching, if the preamble sequence is transmitted successfully, the transmission of the preamble sequence is stopped, and the subsequent random access process is performed. Otherwise, the RACH re-attempt is performed continuously until the maximum number of random access attempts is reached.

Embodiment 9

As another possible implementation of the embodiments of the present invention, on the basis of what has been shown in Embodiment 1, the step 205 of, if the random access is failed, performing RACH re-attempt, by the user equipment, according to the received RACH re-attempt configuration information to perform random access until the preset decision condition is satisfied, comprises S1005 to S1008 to be shown in Embodiment 9, wherein the operations performed in the S1001 to S1004 are similar to the operations performed in the S201 to S204 and will not be repeated herein.

S1005: If the random access is failed, the user equipment determines a fifth transmission power.

Wherein, the fifth transmission power is a transmission power based on the first transmission power with a preset power ramping step.

In the embodiment of the present invention, if the random access is failed, the user equipment increases the transmission power by a preset power ramping step, as the fifth transmission power.

In the embodiment of the present invention, before transmitting the preamble sequence, the user equipment needs to determine the preamble Initial Received Target Power and the DELTA_PREAMBLE in order to determine the first transmission power.

Wherein, the first transmission power=preambleInitialReceivedTargetPower+DELTA_PREAMBLE.

In the embodiment of the present invention, before transmitting the preamble sequence, the user equipment sets the PREAMBLE_TRANSMISSION_COUNTER as 1 and the PREAMBLE_TRANSMISSION_POWER_COUNTER as 1.

In the embodiment of the present invention, the user equipment receives a random access response within a receiving time window for a random access response, which is specified in the system configuration information. Wherein, if no random access response is received within this time window, or an identifier of a preamble sequence carried in the random access response information is different from an identifier corresponding to a preamble sequence transmitted by the user equipment to the base station, or a user equipment identifier carried in collision resolution information is different from the corresponding identifier, the PREAMBLE_TRANSMISSION_COUNTER is increased by 1 to obtain the current PREAMBLE_TRANSMISSION_COUNTER_6.

Wherein, if PREAMBLE_TRANSMISSION_COUNTER_6= preambleTransMax+1, the maximum number of random access attempts is reached. It is considered that the random access process is failed. The random access process ends.

Wherein, if PREAMBLE_TRANSMISSION_COUNTER_ 6<preambleTransMax+1, the PREAMBLE_TRANSMISSION_POWER_COUNTER is increased by 1 to obtain the current PREAMBLE_TRANSMISSION_ POWER_COUNTER_5, wherein the PREAMBLE_RECEIVED_TARGET_POWER is set as preambleInitialReceivedTargetPower+DELTA_PREAMBLE+ (PREAMBLE_TRANSMISSION_POWER_ COUNTER_5−1)*powerRampingStep.

In the embodiment of the present invention, during the RACH re-attempt, if the user equipment needs to perform RACH re-attempt again, the above-described power ramping and beam switching mechanisms can be repeated, the transmission power for the preamble sequence is increased by a preset step, and the RACH re-attempt is performed in turn by each beam.

S1006: The user equipment performs RACH re-attempt, according to the fifth transmission power and by each transmitting beam from the selectable beams in turn, to perform random access.

In the embodiment of the present invention, if the random access is failed, the user equipment can increase the transmission power for the preamble sequence by a preset power ramping step, and then perform RACH re-attempt, according to the increased transmission power and by each transmitting beam in turn.

S1007: If the random access is failed, the user equipment re-determines a transmission power as a sixth transmission power, and performs RACH re-attempt by each transmitting beam from the selectable beams in turn.

Wherein, the sixth transmission power is a transmission power based on a corresponding transmission power by a preset power ramping step when the previous random access is failed.

S1008: The S1007 is cycled until the preset condition is satisfied.

For example, the sum of the preamble Initial Received Target Power and the DELTA_PREAMBLE is P, and the power Ramping Step is Δ. In this case, the flowchart of the RACH re-attempt is shown in FIG. 12. Wherein, the user equipment configures three beam directions, transmits the preamble sequence by the beam 0 and the power P, and configures both a power ramping mechanism and a beam switching mechanism simultaneously when random access fails, to perform RACH re-attempt by the beam 0, beam 1 and beam 2 in turn and a power P+Δ. When the user equipment needs to r perform RACH re-attempt again, it continuously configures the above-described power ramping mechanism and beam switching mechanism. When the preamble sequence is transmitted successfully or the maximum number of random access attempts is reached, the random access process ends.

It is to be noted that, when performing the above-described beam switching operation, the user equipment can select one or more beams from all beams or a subset thereof according to certain rules, or can randomly select one or more beams from all beams or the subset thereof. In the embodiment of the present invention, in the RACH re-attempt process based on power ramping and beam switching, if the preamble sequence is transmitted successfully, the random access is stopped, and the subsequent random access process is performed. Otherwise, the RACH re-attempt is performed continuously until the maximum number of random access attempts is reached.

In the embodiment of the present invention, after the random access is failed, the user equipment increases the transmission power for the preamble sequence, and performs RACH re-attempt by each beam in turn; if the random access is failed, the user equipment increases the transmission power for the preamble sequence again and still performs RACH re-attempt by each beam in turn. In this way, the probability of RACH re-attempt successfully can be increased, and further, the performance of the random access process can be improved.

Embodiment 10

As another possible implementation of the embodiments of the present invention, on the basis of what has been shown in Embodiment 2, the S305 of, if the random access is failed, by the user equipment, increasing a transmission power for transmitting a preamble sequence by a preset power ramping step to perform random access; and/or the S306 of, if a transmitting beam for a preamble sequence changes, and/or the PRACH resource changes, by the user equipment, adjusting a transmission power for transmitting the preamble sequence by a preset power to perform random access until the preset decision condition is satisfied, comprises S1005 to S1012 to be shown in Embodiment 10, wherein the operations performed in the S1001 to S1004 are similar to the operations performed in the S301 to S304 and will not be repeated herein.

S1105: If the random access is failed, the user equipment determines a seventh transmission power, and performs RACH re-attempt by the first PRACH resource and the seventh transmission power.

Wherein, the seventh transmission power is a transmission power based on the first transmission power with a preset power ramping step, and the first transmission power is a transmission power for transmitting the preamble sequence for the first time.

In the embodiment of the present invention, before transmitting the preamble sequence, the user equipment needs to determine a preambleInitialReceivedTargetPower and a DELTA_PREAMBLE, in order to determine the first transmission power.

Wherein, the first transmission power=preambleInitialReceivedTargetPower+DELTA_PREAMBLE.

In the embodiment of the present invention, before performing random access, the user equipment sets the PREAMBLE_TRANSMISSION_COUNTER as 1 and PREAMBLE_TRANSMISSION_POWER_COUNTER as 1.

S1106: If the random access is failed, the user equipment increases a transmission power for transmitting a preamble sequence by a preset power ramping step and performs RACH re-attempt by the increased random access transmission power and the first PRACH resource.

In the embodiment of the present invention, the user equipment receives a random access response within a receiving time window for a random access response, which is specified in the system configuration information. Wherein, if no random access response is received within this time window, or an identifier of a preamble sequence carried in the random access response information is different from an identifier corresponding to a preamble sequence transmitted by the user equipment to the base station, or if a user equipment identifier carried in collision resolution information is different from the corresponding identifier, the PREAMBLE_TRANSMISSION_COUNTER is increased by 1 to obtain the current PREAMBLE_TRANSMISSION_COUNTER_7.

Wherein, if PREAMBLE_TRANSMISSION_COUNTER_7= preambleTransMax+1, the maximum number of random access attempts is reached. It is considered that the random access process is failed. The random access process ends.

Wherein, if PREAMBLE_TRANSMISSION_COUNTER_7< preambleTransMax+1, the PREAMBLE_TRANSMISSION_POWER_COUNTER is increased by 1 to obtain PREAMBLE_TRANSMISSION_POWER_COUNTER_6, and then RACH re-attempt is performed, wherein the PREAMBLE_RECEIVED_TARGET_POWER is set as:

preambleInitialReceivedTargetPower+DELTA_PREAMBLE+(PREAMBLE_TRANSMISSION_POWER_COUNTER_6−1)*power Ramping Step.

In the embodiment of the present invention, if the random access fails, the user equipment can increase the transmission power for the preamble sequence to transmit the preamble sequence.

S1107: The S1106 is cycled until the third preset condition is satisfied.

Wherein, the third preset condition can comprise at least one of the following: maximum number of each PRACH resource attempts, successful random access, maximum transmission power, or conditions preset by a user equipment.

Wherein, the conditions preset by a user equipment can be as follows: the transmission power satisfying the third preset condition is greater than the transmission power when the random access is performed by another certain PRACH resource.

S1108: If the random access is failed, the user equipment reselects any one PRACH resource from other selectable PRACH resource as a second PRACH resource.

In the embodiment of the present invention, the user specifies four PRACH resource in advance, respectively: the first PRACH resource, the second PRACH resource, the third PRACH resource and the fourth PRACH resource.

S1109: The user equipment re-determines a transmission power as an eighth transmission power.

In the embodiment of the present invention, the eighth transmission power can be identical to the first transmission power, or the eighth transmission power can be identical to a transmission power when the third preset condition is satisfied, or the transmission power when the third preset condition is satisfied is increased by a preset power ramping step and a power obtained by increasing by a preset power ramping step is used as the eighth transmission power, or the existing transmission power of the second PRACH resource is increased by a preset power ramping step and a power obtained by increasing by a preset power ramping step is used as the eighth transmission power. It should be noted that for the last case, the existing transmission power of the second PRACH resource is calculated based on the initial transmit power of the second PRACH resource.

As can be seen, FIG. 13(A)-(D) are schematic flowcharts corresponding to the four different cases for the power change in the step 1109 according the present application. Case 1 in FIG. 13(A) refers to the case that the random access transmission power is reset to the initial state. Case 2 in FIG. 13(B) refers to the case that the random access transmission power remains unchanged. Case 3 in FIG. 13(C) refers to the case that the power is keeping increasing with the same initial random access transmission power. Case 4 in FIG. 13(D) refers to the case that the random access transmission power is keeping increasing and re-calculate the initial random access transmission power (based on the new PRACH resource).

Wherein, the S1108 can be performed prior to the S1109; or the S1109 can be performed prior to the S1108; or the S1108 and the S1109 can be performed simultaneously. It is not limited in the embodiment of the present invention.

S1110: The user equipment performs RACH re-attempt by the eighth transmission power and the second PRACH resource to perform random access.

In the embodiment of the present invention, if the user equipment previously performs RACH re-attempt by the first PRACH resource and by gradually increasing the transmission power until the third preset condition is satisfied, then, the user equipment can use other PRACH resource, for example, the second PRACH resource, and the re-determined transmission power.

S1111: If the random access is failed, the user equipment gradually increases a transmission power for transmitting a preamble sequence by a preset power ramping step, and performs RACH re-attempt by the increased transmission power and the second PRACH resource to perform random access.

In the embodiment of the present invention, if the transmission of the random access fails, the user equipment performs RACH re-attempt by the selected second PRACH resource and by gradually increasing the transmission power for random access on the basis of the transmission power for random access last time.

S1112: If the random access is failed and the third preset condition is satisfied, the S1108 to S1111 are cycled until the preset decision condition is satisfied.

In the embodiment of the present invention, if the random access to the base station by the second PRACH resource is still failed, and the maximum number of the second PRACH resource attempt is reached or the maximum transmission power is reached, the user equipment perform random access by the third PRACH resource and by gradually increasing the transmission power for random access. If it is failed, and the maximum number of the third PRACH resource attempt is reached or the maximum transmission power is reached, the user equipment performs random access to the base station by the fourth PRACH resource and by the above-described power increasing method, until the random access is successful or the maximum number of random access attempts is reached.

It is to be noted that, when performing the above-described PRACH resource reselection operation, the user equipment can select one resource from all PRACH resource or a subset thereof according to certain rules, or can randomly select one resource from all PRACH resource or the subset thereof. In the embodiment of the present invention, in the RACH re-attempt process based on power ramping and PRACH resource reselection, if the random access is performed successfully, the random access is stopped, and the subsequent random access process is performed. Otherwise, the RACH re-attempt is performed continuously until the maximum number of random access attempts is reached.

In the embodiment of the present invention, after the random access to the base station is failed, the user equipment increases the transmission power for the preamble sequence first, then reselects the PRACH resource, and increases the transmission power for random access in the reselected PRACH resource until the random access successfully to the base station or the preset decision condition is satisfied. In this way, the probability of RACH re-attempt successfully can be increased, and further, the performance of the random access process can be improved.

An embodiment of the present invention provides a user equipment, as shown in FIG. 14, comprising a receiving module 1201 and a transmitting module 1202, wherein:

the receiving module 1201 is configured to receive system configuration information transmitted by a base station, wherein, the system configuration information comprises a RACH re-attempt configuration information; and the transmitting module 1202 is configured to transmit a preamble sequence to the base station to perform random access; and the transmitting module 1202 is further configured to, if the random access is failed, performing RACH re-attempt according to the received RACH re-attempt configuration information to perform random access until a preset decision condition is satisfied.

The embodiment of the present invention provides a user equipment. Compared with the prior art, the method of the present invention comprises the steps of: by a base station, determining system configuration information and transmitting the system configuration information to a user equipment; and then, by the user equipment, transmitting a preamble sequence to perform random access, and if the random access is failed, performing RACH re-attempt according to the received RACH re-attempt configuration information to perform random access until a preset decision condition is satisfied. That is, the base station can transmit RACH re-attempt configuration information to the user equipment so that, after the random access is failed, the user equipment performs RACH re-attempt according to the above-described RACH re-attempt configuration information to perform random access. In this way, the user equipment can perform RACH re-attempt according to a RACH re-attempt solution.

An embodiment of the present invention provides a base station, as shown in FIG. 15, comprising a determination module 1301 and a transmitting module 1302, wherein:

the determination module 1301 is configured to determine system configuration information; and the transmitting module 1302 is configured to transmit the system configuration information to the user equipment, wherein, the system configuration information comprises a RACH re-attempt configuration information.

The embodiment of the present invention provides a base station. Compared with the prior art, the method of the present invention comprises the steps of: by a base station, determining system configuration information and transmitting the system configuration information to a user equipment; and then, by the user equipment, transmitting a preamble sequence to perform random access, and if the random access is failed, performing RACH re-attempt according to the received RACH re-attempt configuration information to perform random access until a preset decision condition is satisfied. That is, the base station can transmit RACH re-attempt configuration information to the user equipment so that, after the random access is failed, the user equipment performs RACH re-attempt according to the above-described RACH re-attempt configuration information to perform random access. In this way, the user equipment can perform RACH re-attempt according to a RACH re-attempt.

The user equipment and base station provided by the embodiments of the present invention can implement the method embodiments described above. The specific implementation of functions thereof refers to the description of the method embodiments, and will not be repeated here. The method for RACH re-attempt, the user equipment and the base station provided by the embodiments of the present invention can be used for RACH re-attempt to the base station to perform random access, after the random access is failed. However, they are not limited thereto.

It should be understood by those skilled in the art that the present invention involves apparatuses for performing one or more of operations as described in the present invention. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely preferred embodiments of the present invention. It should be noted that, for a person of ordinary skill in the art, various modifications and embellishments can be made without departing from the principle of the present invention. Such modifications and embellishments shall be regarded as falling into the protection scope of the present invention.

The invention claimed is:

1. A method performed by a terminal in a wireless communication system, the method comprising:
   setting a preamble transmission counter to 1;
   setting a preamble power ramping counter to 1;
   transmitting, to a base station, a random access preamble by using a first transmission power identified based on the preamble power ramping counter;
   increasing the preamble transmission counter by 1, in case that a random access window expires and a random access response corresponding to the random access preamble is not received;
   in case that a transmission beam for a retransmission of the random access preamble is not switched, increasing the preamble power ramping counter by 1 for the retransmission, based on the increased preamble transmission counter;
   identifying a second transmission power based on the increased preamble power ramping counter; and
   transmitting, to the base station, the random access preamble by using the second transmission power,
   wherein the first transmission power and the second transmission power are identified based on an equation given by:
   transmission power={initial received target power+delta preamble+(the preamble power ramping counter −1) * preamble power ramping step},
   wherein the delta preamble is a preamble format based power offset value and the preamble power ramping step is a power ramping factor.

2. The method of claim 1, wherein, in case that at least one of the transmission beam for the retransmission or a physical random access channel (PRACH) resource for the retransmission is changed, the preamble power ramping counter is not increased for the retransmission.

3. The method of claim 1, wherein the preamble power ramping counter is increased by 1, in case that the transmission beam for the retransmission is not switched and a PRACH resource for the retransmission is not changed.

4. A method performed by a base station in a wireless communication system, the method comprising:
receiving, from a terminal, a transmission of a random access preamble by using a first transmission power; and
receiving, from the terminal, a retransmission of the random access preamble by using a second transmission power,
wherein a preamble transmission counter is increased by 1, in case that a random access window expires and a random access response reception fails,
wherein a preamble power ramping counter is increased by 1 for the retransmission, in case that a transmission beam for the retransmission is not switched, and
wherein the first transmission power and the second transmission power are identified based on an equation given by:
transmission power={initial received target power+delta preamble+(the preamble power ramping counter −1) * preamble power ramping step},
wherein the delta preamble is a preamble format based power offset value and the preamble power ramping step is a power ramping factor.

5. The method of claim 4, wherein, in case that at least one of the transmission beam for the retransmission or a physical random access channel (PRACH) resource for the retransmission is changed, the preamble power ramping counter is not increased for the retransmission.

6. The method of claim 4, wherein the preamble power ramping counter is increased by 1, in case that the transmission beam for the retransmission is not switched and a PRACH resource for the retransmission is not changed.

7. A terminal in a wireless communication system, the terminal comprising:
a transceiver configured to transmit and receive a signal; and
a controller configured to:
set a preamble transmission counter to 1,
set a preamble power ramping counter to 1,
transmit, to a base station, a random access preamble by using a first transmission power identified based on the preamble power ramping counter,
increase the preamble transmission counter by 1, in case that a random access window expires and a random access response corresponding to the random access preamble is not received,
in case that a transmission beam for a retransmission of the random access preamble is not switched, increase the preamble power ramping counter by 1 for the retransmission, based on the increased preamble transmission counter,
identify a second transmission power based on the increased preamble power ramping counter, and
transmit, to the base station, the random access preamble by using the second transmission power,
wherein the first transmission power and the second transmission power are identified based on an equation given by:
transmission power={initial received target power+delta preamble+(the preamble power ramping counter −1) * preamble power ramping step},
wherein the delta preamble is a preamble format based power offset value and the preamble power ramping step is a power ramping factor.

8. The terminal of claim 7, wherein, in case that at least one of the transmission beam for the retransmission or a physical random access channel (PRACH) resource for the retransmission is changed, the preamble power ramping counter is not increased for the retransmission.

9. The terminal of claim 7, wherein the preamble power ramping counter is increased by 1, in case that the transmission beam for the retransmission is not switched and a PRACH resource for the retransmission is not changed.

10. A base station in a wireless communication system, the base station comprising:
a transceiver configured to transmit and receive a signal; and
a controller configured to:
receive, from a terminal, a transmission of a random access preamble by using a first transmission power, and
receive, from the terminal, a retransmission of the random access preamble by using a second transmission power,
wherein a preamble transmission counter is increased by 1, in case that a random access window expires and a random access response reception fails,
wherein a preamble power ramping counter is increased by 1 for the retransmission, in case that a transmission beam for the retransmission is not switched, and
wherein the first transmission power and the second transmission power are identified based on an equation given by:
transmission power={initial received target power+delta preamble+(the preamble power ramping counter −1) * preamble power ramping step},
wherein the delta preamble is a preamble format based power offset value and the preamble power ramping step is a power ramping factor.

11. The base station of claim 10, wherein, in case that at least one of the transmission beam for the retransmission or a physical random access channel (PRACH) resource for the retransmission is changed, the preamble power ramping counter is not increased for the retransmission.

12. The base station of claim 10, wherein the preamble power ramping counter is increased by 1, in case that the transmission beam for the retransmission is not switched and a PRACH resource for the retransmission is not changed.

* * * * *